April 29, 1930.　　　G. S. OSBORN　　　1,756,380

RUBBER MAT

Filed March 22, 1928

INVENTOR
GEORGE S. OSBORN
By
ATTORNEY

Patented Apr. 29, 1930

1,756,380

UNITED STATES PATENT OFFICE

GEORGE S. OSBORN, OF HARTFORD, CONNECTICUT

RUBBER MAT

Application filed March 22, 1928. Serial No. 263,737.

My invention relates to rubber mats.

It has for its object to provide an improved rubber mat or rug, and more particularly, a mat adapted to use as a floor covering, and especially to use as a bath mat or for similar purposes in a sick room or the like. A further object of my invention is to provide such an improved mat presenting an improved tread surface of sponge rubber which is soft and yielding to the feet, and which further has a drying effect. Another object is to provide a mat which is so constructed that, while still soft and yielding, it is water-proof and not only prevents the draining off of water into pools on the floor at the side of the mat, but can be readily cleansed. Other objects of my invention are to provide a mat which is very light in weight, attractive in appearance, of good wearing quality, and capable of being cheaply manufactured. These and other objects and advantages of my improved construction will, however, hereinafter more fully appear.

In the accompanying drawings, I have shown, for purposes of illustration, three embodiments which my invention may assume in practice.

In these drawings:—

Figure 1:
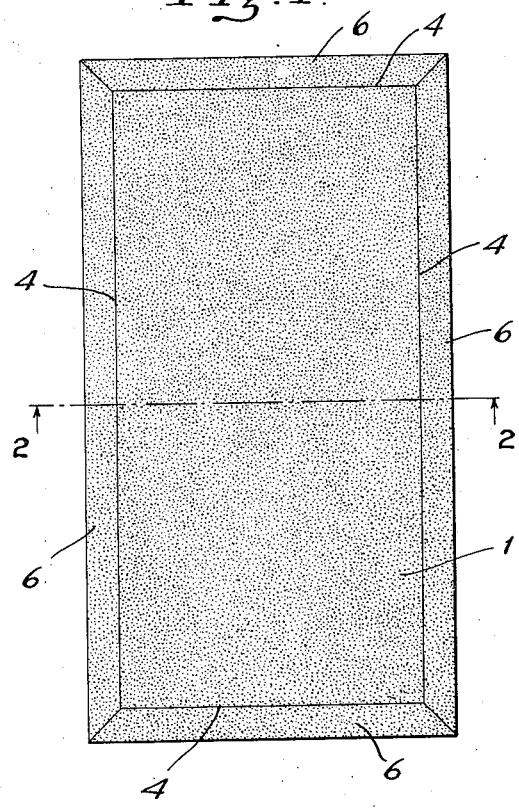
Figure 1 is a plan view of a mat constructed in accordance with my improvement.
Figure 2:
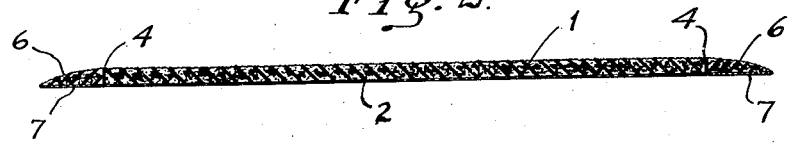
Fig. 2 is an enlarged transverse sectional view taken on line 2—2 of Fig. 1.

In the construction shown in Figs. 1 and 2, I have illustrated a mat of usual rectangular bath mat shape but comprising a tread or body 1 of exposed sponge rubber and having an improved construction hereinafter described.

More particularly, it will be noted that the body 1 has an exposed sponge rubber tread surface of soft, open cellular structure and preferably of fine texture, and that the bottom 3 of the same is formed by the ordinary rind common on the outer surface of sponge rubber. Preferably, the mat is also relatively thin, as for example of a height of five-sixteenths of an inch, or, if desired, it may be only one-fourth of an inch thick, these figures including the bottom rind; although of course the thickness may be varied as desired. Attention is also directed to the fact that I utilize rind on the sides of the body 1, providing upright sides 4 which unite with the bottom 2 to enclose the sides and bottom of the body 1 and make it water-tight, while leaving the sponge rubber top or tread exposed.

In a preferred form the body 1 is formed from a sheet of sponge rubber which as usual has this rind on its top and bottom and on its vertical side walls, the body 1 being obtained by splitting such a sheet in two horizontally so that each half of the sheet may be used to provide a mat, each of which is thus simultaneously and economically formed with the desired exposed sponge rubber tread surface and its upright sides and ends 4 cooperating with the bottom 2 to make it water-tight.

In a preferred form, I also suitably attach to these walls 4 a border 6, likewise of sponge rubber. Herein, as preferably, I leave the rind on the bottom 7 of this border, but remove it from its top and outer side to expose the sponge rubber and present a softer and more attractive effect. In a preferred form, the side adjacent the body also has the rind removed and is vulcanized directly to the outer sides of the walls 4 of the body 1, this construction giving a more soft effect.

Figure 3:
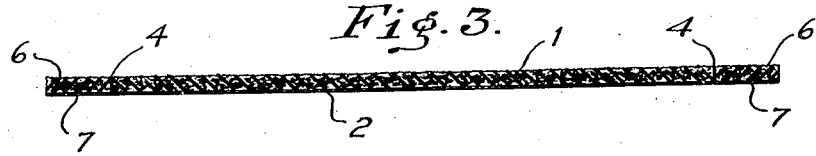
Fig. 3 is a similarly enlarged view showing a mat embodying a slightly modified border construction.

It will be evident that the structure of the border 6 may be varied in several respects, such, for example, as by having this rind left on and vulcanized directly to the rind on the sides 4, taking off the bottom rind, or leaving on the outside edge rind, though these are not preferred. In Fig. 2 I have also shown the border 6 as sloping from the body 1 and slightly crowned. If desired, however, the outer edges of the border 6 may be provided with square corners, as shown in Fig. 3.

Figure 4:
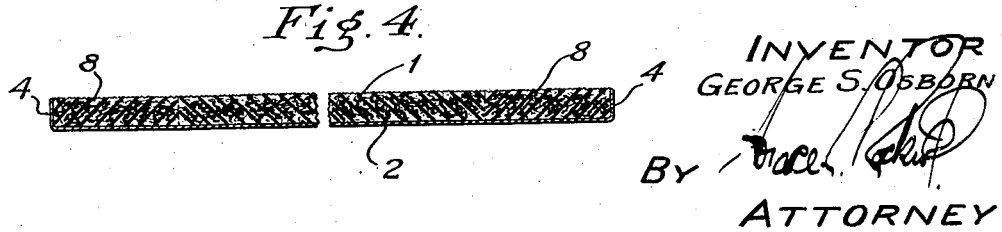
Fig. 4 is a further enlarged view showing another modified construction.

If desired, the border 6 also may be omitted, in which case the construction would appear as in Fig. 4, with the upright rind 4 then forming the outer edge of the mat. To provide for a decorative border in such a construction, it will be evident that if desired a portion of the edge, as for example that indicated at 8, may be suitably treated or dipped to make its color contrast with the body portion. It will also be noted that due to the use of the rind as the outer wall, the latter will be relatively soft while still adapted to perform its function of preventing leakage of water onto the floor.

As a result of my improved construction, an exceedingly soft and attractive mat is provided, presenting a sponge rubber tread surface which, when the same is used as a bath mat, is capable of performing the drying and water retaining functions mentioned. It is further capable of being embodied in attractive contrasting color and texture combinations. Thus, for example, it is evident that the body and border may be of contrasting colors and also of contrasting textures, the body 1, for example, in a preferred form being of a fine texture closely approximating fabric, while the border is of like or coarser texture and of a contrasting color. Attention is moreover directed to the fact that through my improved border construction wherein the border is connected to the sides 4 on the body, the whole mat is kept soft to the feet and presents no hard ridges. Moreover, where a border is used, the attachment of the latter is facilitated. It will also be evident that through utilizing the rind on the bottom of the mat and on the side and end walls thereof the wearing quality is improved, at the same time that it is made possible to utilize ordinary wholly enclosed sponge rubber sheets and thus provide the mat very economically by splitting or horizontally cutting the sheet of this sponge rubber in half. Attention is also directed to the fact that the mat produced is exceedingly light. This is due not only to the sponge rubber body, but to the use of the rind, as hereinabove brought out, it being possible to eliminate or minimize the necessity for any usual additional base material, such, for example as rubber or fabric, further increasing the weight of the mat and ordinarily unnecessary, although it will be evident that such a suplemental base may be used if desired. It will also be evident that if desired the mat may be of any size or shape and adapted to other floor covering uses than a bath mat. These and other advantages of my improved construction will, however, be clearly apparent to those skilled in the art.

While I have in this application specifically described three embodiments which my invention may assume in practice, it will be understood that the same are shown for purposes of illustration and that the invention may be further modified and embodied in various other forms without departing from its spirit or the scope of the appended claims.

What I claim as new and desire to secure by Letters Patent is:—

1. A rubber mat comprising a sponge rubber body having an exposed cellular sponge rubber tread.

2. A rubber mat comprising a sponge rubber body having an exposed cellular sponge rubber tread and the rind thereof forming its bottom.

3. A rubber mat comprising a sponge rubber body having an exposed cellular sponge rubber tread and rind on its bottom and sides.

4. A rubber mat comprising a sponge rubber body having an exposed cellular sponge rubber tread and a border and water retaining means between said body and border.

5. A rubber floor covering comprising a body having an exposed cellular sponge rubber tread and rind on its bottom and a border united to its sides.

6. A rubber floor covering comprising a sponge rubber body having its top of open cellular structure presenting an exposed sponge rubber tread and having rind on its bottom and sides and a border united to said side rind.

7. A rubber floor covering comprising a sponge rubber body having its top of open cellular structure presenting an exposed sponge rubber tread and having rind on its bottom and sides and a border united to said side rind, said border also having an exposed cellular sponge rubber top.

8. A rubber floor covering comprising a sponge rubber body having its top of open cellular structure presenting an exposed sponge rubber tread and having rind on its bottom and sides and a border united to said side rind, said border also having an exposed cellular sponge rubber top and outer side.

9. A rubber floor covering comprising a sponge rubber body having its top of open cellular structure presenting an exposed sponge rubber tread and having rind on its bottom and sides and a border united to said side rind, said border also having rind forming its bottom and an exposed cellular sponge rubber top and outer side.

10. A sponge rubber mat comprising a sponge rubber body having an exposed cellular sponge rubber tread and a border vulcanized to the periphery of said body and also having an exposed cellular sponge rubber tread.

In testimony whereof I affix my signature.

GEORGE S. OSBORN.